United States Patent [19]

Fujii

[11] Patent Number: 4,524,445
[45] Date of Patent: Jun. 18, 1985

[54] METHOD AND CIRCUIT ARRANGEMENT FOR SYNCHRONOUS DETECTION

[75] Inventor: Yasuhiko Fujii, Yamato, Japan

[73] Assignee: Victor Company of Japan, Limited, Japan

[21] Appl. No.: 434,532

[22] Filed: Oct. 14, 1982

[30] Foreign Application Priority Data

Oct. 15, 1981 [JP] Japan ................. 56-164498

[51] Int. Cl.³ .................. G06F 11/10; H04L 7/02
[52] U.S. Cl. .................. 371/47; 371/49; 375/110
[58] Field of Search .............. 371/47, 49; 375/110

[56] References Cited

U.S. PATENT DOCUMENTS

| | | | |
|---|---|---|---|
| 4,271,520 | 6/1981 | Coombes et al. | 371/42 |
| 4,316,284 | 2/1982 | Howson | 371/47 |
| 4,410,990 | 10/1983 | Wilkinson | 371/47 |
| 4,412,329 | 10/1983 | Yarborough | 371/47 |
| 4,425,645 | 1/1984 | Weaver et al. | 371/47 |

FOREIGN PATENT DOCUMENTS

| | | |
|---|---|---|
| 5713836 | 1/1982 | Japan ................ 371/47 |
| 1287093 | 8/1972 | United Kingdom . |
| 1360148 | 7/1974 | United Kingdom . |
| 1374357 | 11/1974 | United Kingdom . |
| 1410921 | 10/1975 | United Kingdom . |
| 1468999 | 3/1977 | United Kingdom . |
| 1507093 | 4/1978 | United Kingdom . |
| 2110509 | 6/1983 | United Kingdom . |

*Primary Examiner*—Charles E. Atkinson
*Attorney, Agent, or Firm*—Lowe, King, Price & Becker

[57] ABSTRACT

A digital signal comprising a plurality of data blocks each comprising a plurality of data words and a parity word is transmitted without a synchronous word or signal indicative of the boundary between two consecutive data blocks. The parity word comprises a plurality of bits each generated from bits of a corresponding row in the original data words in the data block. When receiving the digital signal, the digital signal is first stored in a memory and a plurality of sets of bits in each row is read out to provide parity checking. As a result of parity checking, absence of parity error will be detected in connection with a particular set of bits, and this particular set of bits in each row can be treated as a single row constituting the original data block. The stored digital signal will be read out and output on the basis of information of absence of parity error so that synchronism of data blocks can be established to accurately restore original analog information from the received digital signal having no synchronous word.

13 Claims, 10 Drawing Figures

FIG. 1
PRIOR ART

| 1 | 2 | 3 | 4 | | | |
|---|---|---|---|---|---|---|
| $S_1$ | $a_1,k$ | $b_1,k$ | $p_1,k$ | $S_1$ | $a_1,k+1$ | - - - - |
| $S_2$ | $a_2,k$ | $b_2,k$ | $p_2,k$ | $S_2$ | $a_2,k+1$ | - - - - |
| ⋮ | ⋮ | ⋮ | ⋮ | ⋮ | ⋮ | - - - - |
| $S_n$ | $a_n,k$ | $b_n,k$ | $p_n,k$ | $S_n$ | $a_n,k+1$ | - - - - |

|←——— 1 BLOCK ———→|

TIME →

FIG. 2

| 2 | 3 | 4 | | | |
|---|---|---|---|---|---|
| $a_1,k$ | $b_1,k$ | $p_1,k$ | $a_1,k+1$ | $b_1,k+1$ | - - - - |
| $a_2,k$ | $b_2,k$ | $p_2,k$ | $a_2,k+1$ | $b_2,k+1$ | - - - - |
| ⋮ | ⋮ | ⋮ | ⋮ | ⋮ | - - - - |
| $a_n,k$ | $b_n,k$ | $p_n,k$ | $a_n,k+1$ | $b_n,k+1$ | - - - - |

|←—— 1 BLOCK ——→|

TIME →

TIME

METHOD AND CIRCUIT ARRANGEMENT FOR SYNCHRONOUS DETECTION

BACKGROUND OF THE INVENTION

This invention relates to method and circuit arrangement for synchronous detection useful in a digital signal transmission system.

When a digital signal obtained by digital modulating, such as pulse code modulation (PCM), an analog information signal, is transmitted through a transmission line, a synchronous signal word for separating each data from another and a parity word for the detection and correction of errors made during transmission are usually respectively added to data words constituting the digital signal prior to transmission. The synchronous signal word is added to one end of each block having a plurality of data words and a parity word so that it indicates the boundary between two consecutive data blocks in a digital signal. The data word will be detected at a receiving end of a transmission line to distinguish or separate each data block from another. Therefore, in the conventional digital data transmission systems, addition of such a data word has been essential. However, each synchronous data word occupies a given period of time and therefore, addition of such a synchronous signal to data words has been an obstacle to the increase of transmission rate.

SUMMARY OF THE INVENTION

The present invention has been developed in order to remove the above-described drawback inherent to the conventional digital data transmission system.

It is, therefore, an object of the present invention to provide a new and useful method and circuit arrangement for synchronous detection so that synchronism of transmitted data blocks constituting a digital signal can be detected even when no synchronous words are added to the digital signal, resulting in increase in data transmission amount per unit time.

According to a feature of the present invention, a digital signal comprising a plurality of data blocks each having a plurality of data words and a parity word is transmitted without synchronous words or signal, and the boundary between any two consecutive data blocks is detected, at the receiving end, by parity checking the transmitted data bits in such a manner that various combinations of data bits are parity checked to find a particular combination in which no parity error occurs.

In accordance with the present invention there is provided a method of detecting synchronism of input data blocks constituting a digital signal, where each data block comprises a plurality of data words each having "n" bits, wherein "n" is a positive integer, and a parity word generated in such a manner that each bit in the parity word is given by:

$p_{m,k} = a_{m,k} \oplus b_{m,k} \oplus \ldots$ wherein $a_{m,k}, b_{m,k} \ldots$ are bits in a single row of the plurality of data words;

m is a positive integer and $1 \leq m \leq n$, and $\oplus$ indicates modulo-two summation;

the "n" bits of each word being transmitted in parallel in such a manner that the digital signal comprises "n" rows, the method comprising the steps of: storing the digital signal into a memory in such a manner that the bits $a_{m,k}, b_{m,k} \ldots p_{m,k}$ of each row are stored according to the order of the received words; reading out a plurality of sets of consecutive bits, whose number equals the total number of words included selected to form each data block, where the combination of bits selected to form each set is different throughout the plurality of sets of bits; parity checking in connection with the plurality of sets of bits read out; detecting a state of the absence of parity error to ascertain which set of the bits does not result in parity error; and deriving a set of bits from the memory in connection with each row in accordance with the result of the detection of the absence of parity error to output the set of bits as a single row constituting a synchronized data block.

In accordance with the present invention there is also provided a circuit arrangement for detecting synchronism of input data blocks constituting a digital signal, where each data block comprises a plurality of data words each having "n" bits, wherein "n" is a positive integer, and a parity word generated in such a manner that each bit in the parity word is given by:

$p_{m,k} = a_{m,k} \oplus b_{m,k} \oplus \ldots$ wherein $a_{m,k}, b_{m,k} \ldots$ are bits in a single row of the plurality of data words;

m is a positive integer and $1 \leq m \leq n$, and $\oplus$ indicates modulo-two summation;

the "n" bits of each word being transmitted in parallel in such a manner that the digital signal comprises "n" rows, the circuit arrangement comprising: first means for storing the digital signal in such a manner that the bits $a_{m,k}, b_{m,k} \ldots p_{m,k}$ of each row are stored according to the order of the received words; second means responsive to a plurality of sets of consecutive of bits read out from the first means, the number of the consecutive bits in each set being equal to the total number of words included in each data block, the combination of bits selected to form each set being different throughout the plurality of sets of bits, the second means being arranged to provide respectively parity checking in connection with the plurality of sets of bits read out; third means for detecting the absence of parity error to ascertain which set of the bits does not result in parity error; and fourth means for deriving a set of bits from the first means in connection with each row in accordance with the result of the detection of the absence of parity error to output the set of bits as a single row constituting a synchronized data block.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, the above-mentioned conventional system for data transmission will be described for a better understanding of the present invention.

Figure 1:
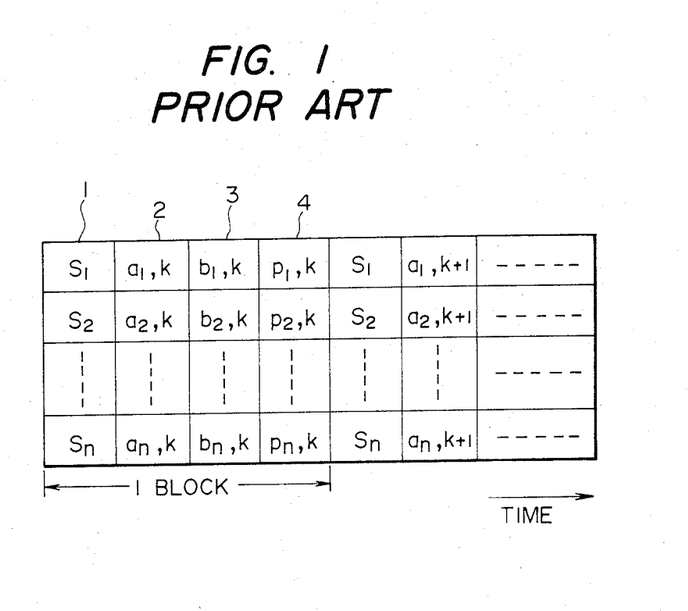
FIG. 1 is a diagram showing an example of a structure of a conventional block signal.

FIG. 1 is a schematic diagram showing the structure of a conventional digital signal comprising a plurality of blocks each having a plurality of data words. In FIG. 1, a synchronous signal word 1 comprises n-bits $s_1$ to $s_n$ (n is a positive integer), and this is combined with an n-bit data word 2 ($a_{1,k}$ to $a_{n,k}$) (k is a positive integer) of first data, a data word 3 ($b_{1,k}$ to $b_{n,k}$) of second data, and a parity word 3 ($p_{1,k}$ to $p_{n,k}$) as a time series to form one block and these data are transmitted one after another. In the past, in order to restore a block signal of such a structure into an original analog information signal at the receiving end, the boundaries between blocks received are detected from the synchronous signal word 1. To this end, it has been hitherto thought that a synchronous signal word 1 is essential in a data block to be transmitted.

In the present invention, however, no synchronous data word is added to the data blocks, and therefore, the amount of information to be sent per unit time can be increased as much as the amount or time length of synchronous words. In the present invention, a received digital signal is stored in a memory and parity checking is effected in connection with various combinations of consecutive bits, and the result of parity checking is effectively used to find a particular combination of bits showing no parity error so that the received data blocks of the digital signal can be automatically synchronized when being derived from the memory.

Figure 2:
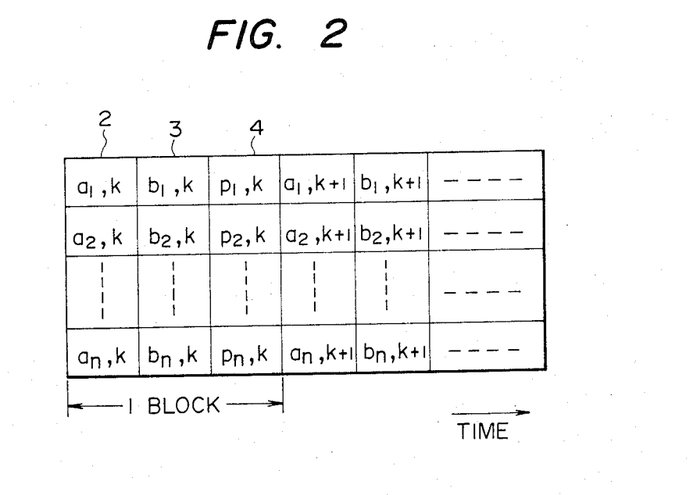
FIG. 2 is a diagram showing an embodiment of the structure of a block signal according to the present invention system.

FIG. 2 shows the structure of a data block to be detected by the synchronous detection system according to the present invention. In this diagram the reference 2 is a data word of first data which comprises n-bits $a_{1,k}$ to $a_{n,k}$, and a data word 3 of second data also comprises bits $b_{1,k}$ to $b_{n,k}$, while a parity word 4 comprises bits $p_{1,k}$ to $p_{n,k}$. Each bit of the parity word 4 can be obtained from the following formula (1) using the first and second data words 2 and 3.

$$p_{m,k} = a_{m,k} \oplus b_{m,k} \quad \ldots (1)$$

wherein m is a positive integer and $1 \leq m \leq n$, and
$\oplus$ indicates modulo-two summation.

Namely, each block of the input signal to be synchronous detected with the system according to the present invention comprises data words 2 and 3, and a parity word 4, while no synchronous signal word exists, and the block is transmitted in n-bit parallel.

In the absence of a synchronous signal word, the boundary between input block signals cannot be detected at the receiving end with conventional techniques. However, the number of words forming each block, and the formula (1) for the generation of the parity word 4 are usually known at the receiving end, and therefore, if the boundary between input block signals is correct, the result of modulo-two summation in each row constituting each block should equal "0". The present invention has made it possible to detect the boundary between the input block signals shown in FIG. 2, having no synchronous signal word in view of the above.

Figure 3:
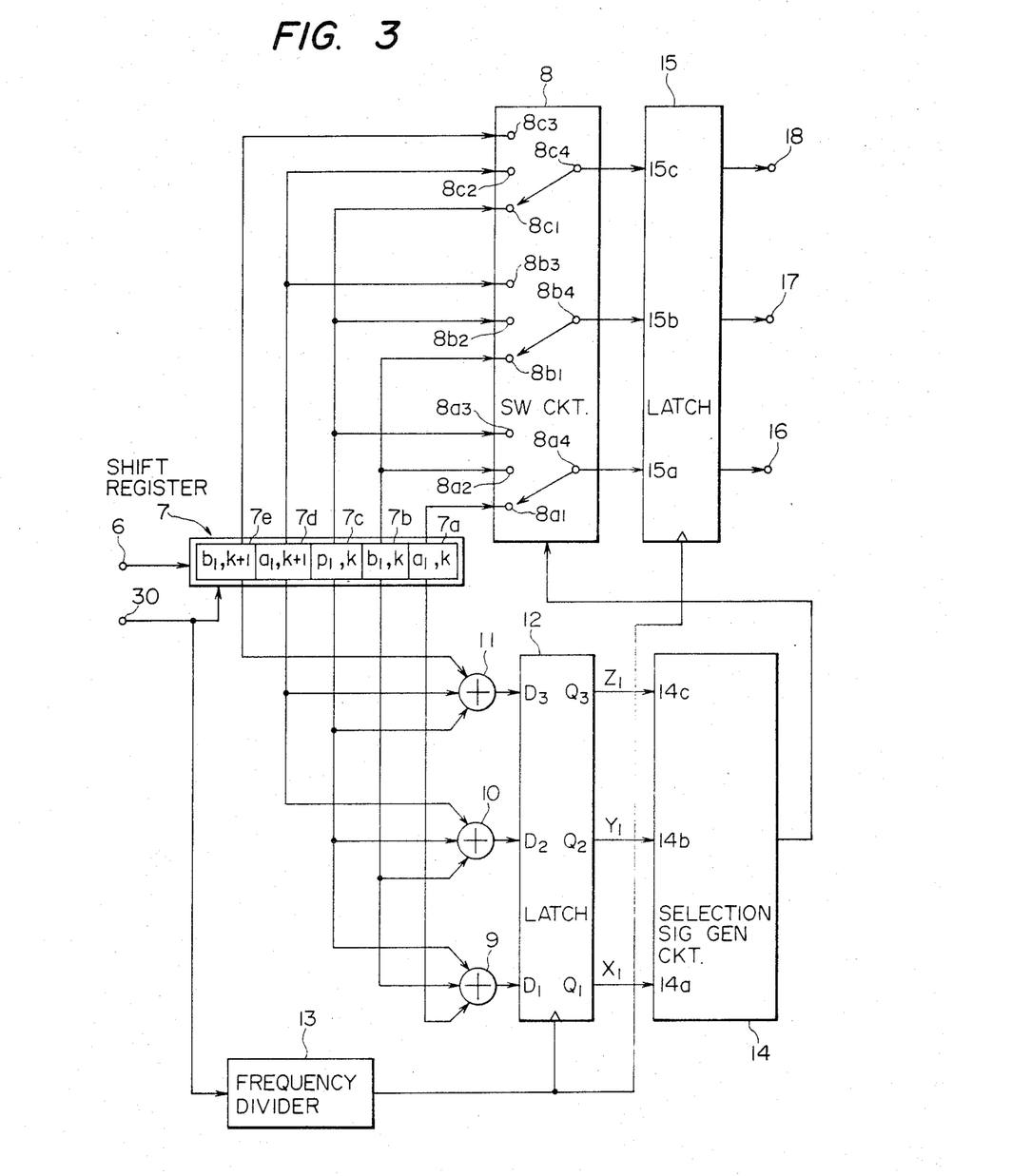
FIG. 3 is a block diagram for the description of the principle of the present invention system.

FIG. 3 shows a block diagram for the explanation of the principle of the system according to the present invention. In this diagram, to an input terminal 6 are fed first row bits ($a_{1,k}$, $b_{1,k}$, $p_{1,k}$ etc) among the input block signal, and they are fed to a shift register 7 having cells 7a to 7e. Then they are shifted from the left to the right in FIG. 3 in response to a clock pulse supplied from an input terminal 30. Thus, the bits are in a stored state, for instance such that the bit $a_{1,k}$ of the data word 2 of the first data block is at the right most place 7a, and the bit $b_{1,k+1}$ of the second data block in the left most cell 7e. The place 7a feeds its contents to a terminal 8a1 of a switching circuit 8 and to a parity checker 9, the cell 7b feeds its contents to terminals 8a2 and 8b1 and to parity checkers 9 and 10, the cell 7c feeds its contents to terminals 8a3, 8b2, 8c1 and to parity checkers 9, 10 and 11, the cell 7d feeds its contents to terminals 8b3 and 8c2 and to parity checkers 10 and 11, and the cell 7e feeds its contents to a terminal 8c3 and to parity checker 11. The parity checkers 9, 10, and 11 performs modulo-two summation of the three inputs fed to each of them, and supplies the result of addition to data input terminals $D_1$, $D_2$ and $D_3$ of a latch 12.

Figure 4A:
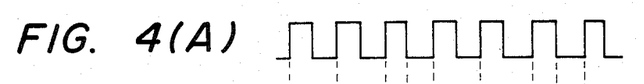
FIGS. 4(A) to 4(C) are time charts showing the internal condition and input output signals of the frequency divider shown in FIG. 3.
Figure 4B:
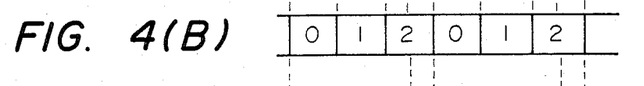
Figure 4C:
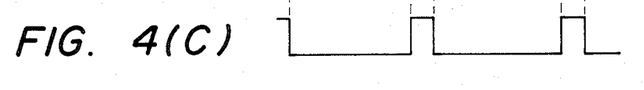

The clock pulse from the input terminal 30 is also fed to a frequency divider 13 in addition to the shift register 7. The frequency divider 13 detects the rising edges of the clock pulse shown in FIG. 4(A), and counts them to change the inner state thereof as shown in FIG. 4(B) so as to generate latch pulse at the timing of FIG. 4(C), and this latch pulse is fed to clock input terminals of latches 12 and 15. The latch 12 holds signals, which are respectively fed to the data input terminals $D_1$, $D_2$ and $D_3$, when the latch pulse from the frequency divider 13 is fed thereto, until a subsequent latch pulse comes from the frequency divider 13, so that it outputs signals $X_1$, $Y_1$ and $Z_1$ from output terminals $Q_1$, $Q_2$ and $Q_3$ to input terminals 14a, 14b and 14c of a selection signal generating circuit 14.

In the case that a pulse is output from the frequency divider 13 under the condition in which the first row bit $a_{1,k}$ of the data word 2 is stored in the cell 7a of the shift register 7 and the bit $b_{i,k+1}$ in the cell 7e as shown in FIG. 3, the following relationship is obtained:

$$X_1 = a_{1,k} \oplus b_{1,k} \oplus p_{1,k} \quad (2)$$

$$Y_1 = b_{1,k} \oplus p_{1,k} \oplus a_{1,k+1} \quad (3)$$

$$Z_1 = p_{1,k} \oplus a_{1,k+1} \oplus b_{1,k+1} \quad (4)$$

In the above $X_1$ becomes "0" from formula (1), and thereafter, when a latch pulse is generated from the frequency divider 13, the shift register 7 is subjected to 3-bit shifting, so that the signal $X_1$ equals "0" all the time. The signals $Y_1$ and $Z_1$ respectively have a chance that they become "0", but they do not always equal "0". The selection signal generating circuit 14 receives these signals $X_1$, $Y_1$ and $Z_1$ and generates a control signal when detecting the signal $X_1$, which is always "0", to feed the same to the switching circuit 8. The switching circuit 8 selects so that the terminals 8a1 and 8a4, terminals 8b1 and 8b4, and terminals 8c1 and 8c4 are respectively connected to each other in accordance with the control signal. The selection generating circuit 14 generates a control signal with which the switch 8 selects terminals 8a2, 8b2 and 8c2 when $Y_1$ is "0" all the time, and terminals 8a3, 8b3 and 8c3 when $Z_1$ is "0" all the time. To input terminals 15a, 15b and 15c of the latch 15 are respectively fed signals from terminals 8a4, 8b4 and 8c4 so that the signals respectively fed to the terminals 15a, 15b and 15c are held when the latch pulse is fed thereto from the frequency divider 13, and these signals are respectively output from output terminals 16, 17 and 18. Accordingly, from the output terminal 16 is derived bits $a_{1,k}$, $a_{1,k+}$, $a_{1,k+2}$... of the first row of the first data one after another, from the output terminal 17 bits $b_{1,k}$, $b_{1,k+1}$... of the first row of the second data, from the output terminal 18 bits $p_{1,k}$, $p_{1,k+1}$... of the first row of the parity word one after another.

In this way, by changing the cell of the shift register 7 from which stored contents are derived, in accordance with the result of checking in the parity checkers 9, 10 and 11, series of signals added with boundaries are derived from the output terminals 16, 17 and 18.

Figure 5:
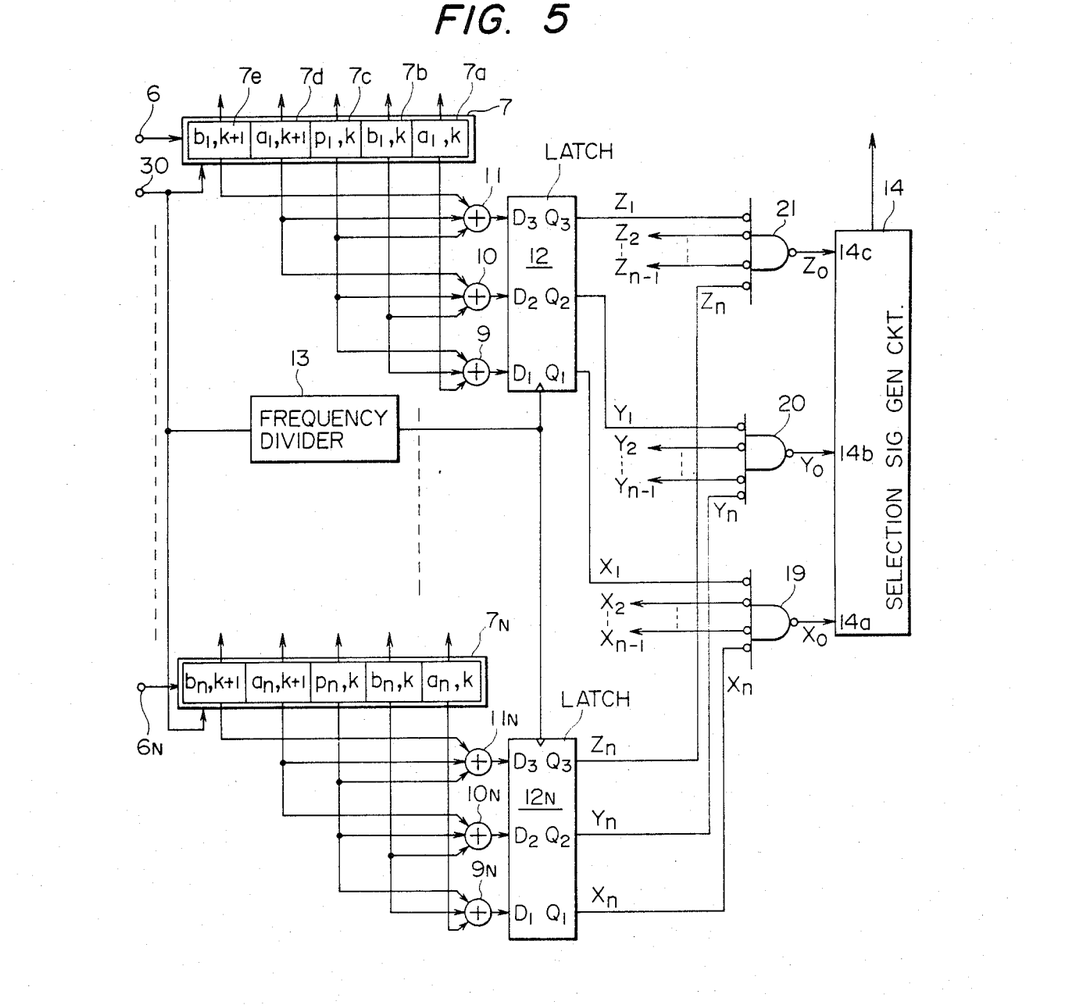
FIG. 5 is a block diagram of an embodiment of the present invention system.

FIG. 5 shows a block diagram of a first embodiment of the system according to the present invention. In this diagram, the same parts as in FIG. 3 are designated at like references, and description thereof is omitted. In FIG. 5, the first row of the input block signal incoming through the input terminal 6 is shifted in the shift register 7 in the same manner as in FIG. 3, and stored contents of respective places 7a to 7e are modulo-two added to each other, and then signals $X_1$, $Y_1$ and $Z_1$ are respectively fed to input terminals of gate circuits 19, 20, and 21. Simultaneously, the second to "n"th rows of the input block signal shown in FIG. 2 are fed from the input terminal to the shift register (only the "n"th row is shown), modulo-two addition is effected in the parity checkers in the same manner as the first row, so that signals expressed by the following formulas will be derived from latches (12N for the "n"th row) of respective rows.

$$X_i = a_{i,k} \oplus b_{i,k} \oplus p_{i,k} \quad (2)'$$

$$Y_i = b_{i,k} \oplus p_{i,k} \oplus a_{i,k+1} \quad (3)'$$

$$Z_i = p_{i,k} \oplus a_{i,k+1} \oplus b_{i,k+1} \quad (4)'$$

wherein i is a positive integer and $1 < i \leq n$.

These signals $X_i$ ($X_2$ to $X_n$) of the respective rows are fed to a gate circuit 19, signals $Y_i$ ($Y_2$ to $Y_n$) to a gate circuit 20, and signals $Z_i$ ($Z_2$ to $Z_n$) to a gate circuit 21. The gate circuits 19, 20 and 21 are AND gates of negative logic arranged to produce "0" when all the input signals ($X_1$ to $X_n$, $Y_1$ to $Y_n$, and $Z_1$ to $Z_n$) respectively fed thereto are "0", and supply respective output signals $X_0$, $Y_0$ and $Z_0$ to the selection signal generating circuit 14. When the first row of the input signal as shown in FIG. 5 is stored in the respective places of the shift register 7, while the shift registers for the second to the "n⇌th rows are in the same condition, the output signal $X_0$ from the gate circuit 19 becomes "0", and the probability that the output signal from the gate circuit 20 becomes "0" is very small, i.e. $\frac{1}{2}^n$, and thus, the selection signal generating circuit 14 detects $X_0$ which always equals "0" from these signals $X_0$, $Y_0$ and $Z_0$. To shift registers provided for respective rows of the input signal are provided switching circuits and latches (not shown) for each row thereof in the same manner as shown in FIG. 3, and the selection signal generating circuit 14 supplies a control signal corresponding to "0" state of the signal $X_0$ to the switching circuits of respective rows. With this arrangement, a series of signals added with boundaries between input block signals is derived for each row. Signal derivation is performed in the same manner as in FIG. 3 throughout all the rows, and thus description thereof is omitted.

Figure 6:
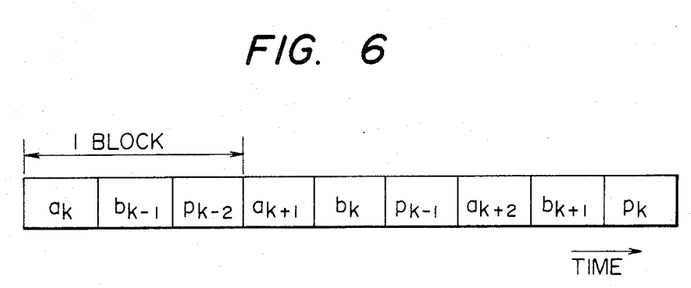
FIG. 6 is a diagram showing an example of a block signal comprising interleaved bits.
Figure 7:
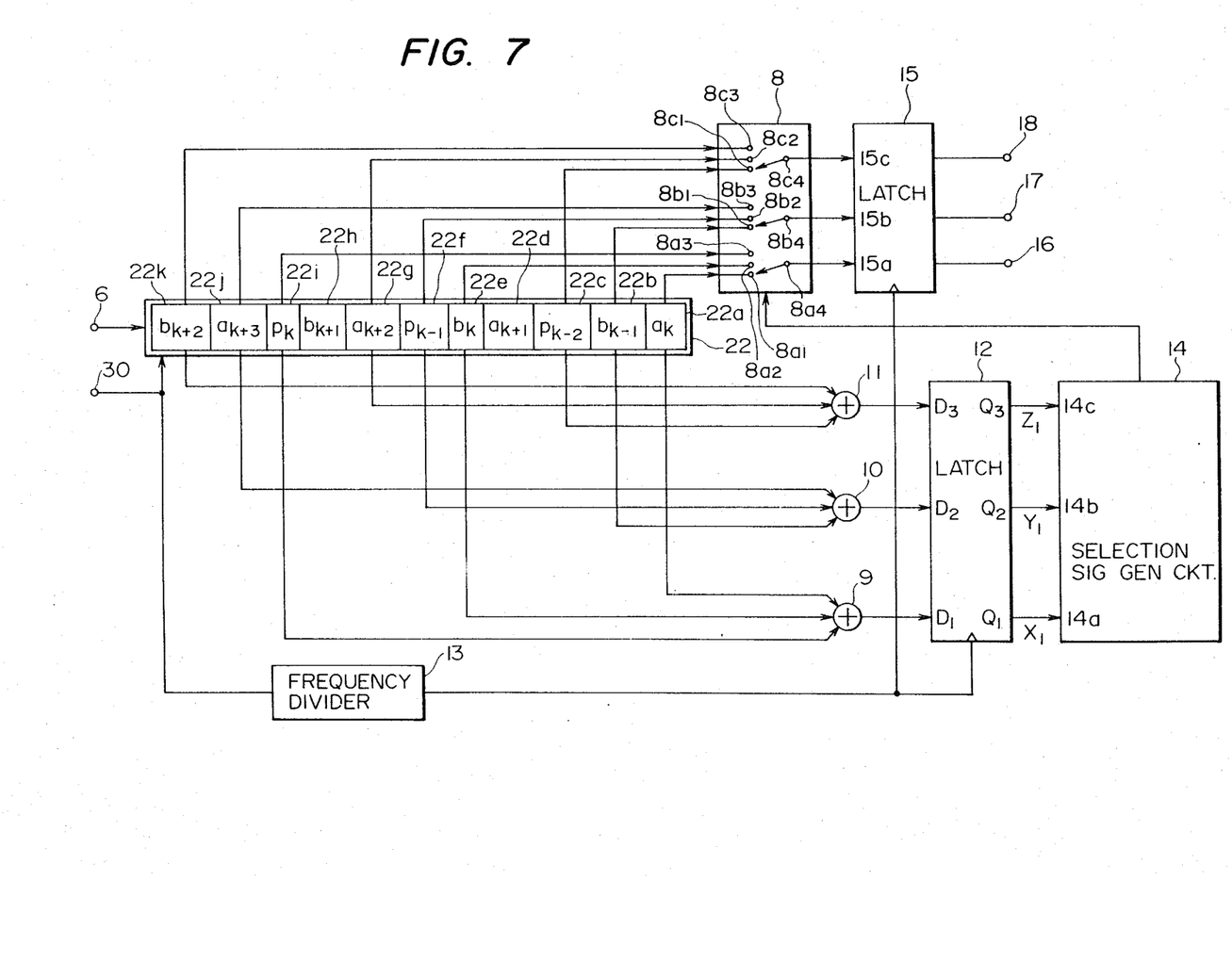
FIG. 7 is a block diagram of another embodiment of the present invention system.

Next, an example of a modification of the system according to the present invention, in which the input signal is interleaved as shown in FIG. 6 so that restoration is effected even if partial dropout occurs during transmission, is shown in FIG. 7. Here, each bit of the input block signal satisfies $p_k = a_k \oplus b_k \ldots$ (5). In FIG. 7, the same parts as in FIG. 3 are designated at like references, and description thereof is omitted. In FIG. 7, the input block signal shown in FIG. 6, from the input terminal 6 is fed to a shift register 22, and then shifted from cell 22k toward a cell 22a in response to a clock pulse from the input terminal 30. The cell 22a of the shift register 22 supplies its stored contents to a terminal 8a1 of the switching circuit 8 and to a parity checker 9, while the cells 22b, 22c, 22e, 22f, 22g, 22i, 22j and 22k respectively supply their contents to terminals 8b1, 8c1, 8a2, 8b2, 8c2, 8a3, 8b3 and 8c3. The parity checker 9 is supplied with the contents of the cells 22e and 22i in addition to the contents of the cell 22a, while the parity checker 10 is supplied with the contents of the cells 22b, 22f and 22j, and the parity checker 11 with the contents of cells 22c, 22g and 22k. Assuming each bit of the input signal is stored in each cell of the shift register 22 as shown in FIG. 7, when the frequency divider 13 produces a latch pulse, $$X_1 = a_k \oplus b_k \oplus p_k \quad (6)$$

$$Y_1 = b_{k-1} \oplus p_{k-1} \oplus a_{k+3} \quad (7)$$

$$Z_1 = p_{k-2} \oplus a_{k+2} \oplus b_{k+2} \quad (8)$$

Therefore, the selection signal generating circuit 14 detects the signal $X_0$, which always equals 0, to generate the control signal with which terminals 8a1 and 8a4, 8b1 and 8b4, and 8c1 and 8c4 of the switching circuit 8 are respectively connected to each other. Therefore bits $a_k$, $b_{k-1}$ and $p_{k-2}$ are simultaneously derived from the respective output terminals 16, 17 and 18.

In the case that the input signal shown in FIG. 6 is of n-bit parallel in the same manner as the input block signal shown in FIG. 2, the circuit shown in FIG. 7 may be changed so that the boundaries of the input block signals are detected for each row of the input block signals, increasing detection accuracy, and the invention is not limited to the above-mentioned embodiment.

In the above-described embodiment, although it has been described that a single block comprises three words, i.e. data bits of first and second data, and parity bits, a single block is not limited to such an arrangement, and a single block may comprise more than three words.

Figure 8:
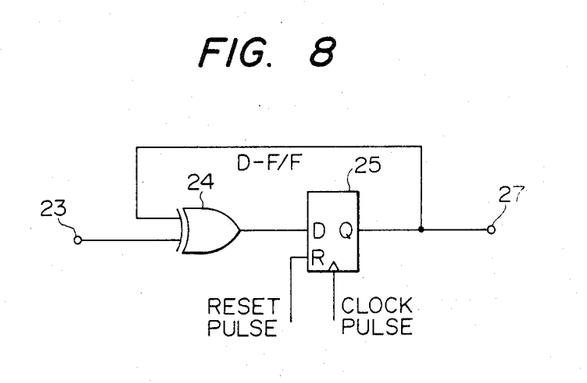
FIG. 8 is a circuit diagram of a modification of a parity checker shown in FIG. 3.

In the above-described embodiment, although parity checking is effected in parallel by means of the parity checkers 9, 10 and 11, parity checking may be effected in series by using a circuit shown in FIG. 8. When using the circuit of FIG. 8 in the circuit of FIG. 3, to an input terminal 23 of FIG. 8 are fed bits $a_{1,k}$, $b_{1,k}$, $p_{1,k}$, $b_{1,k}$, $p_{1,k}$, $a_{1,k+1}$... and bits to be checked for parity checking, in a manner of time series, to be supplied to an input terminal of an EXCLUSIVE OR gate 24. To the other input terminal of the EXCLUSIVE OR gate 24 is fed an output signal of a D-flip-flop 25, and exclusive "or" of both inputs is fed to a data input terminal D of the D-flip-flop 25. To a clock input terminal of the D-flip-flop 25 is fed a clock pulse having a frequency which is three times the frequency of the clock pulse from the terminal 30 of FIG. 5, and an output signal is output from an output terminal Q. To a reset terminal R of the D-flip-flop 25 is fed a reset pulse having a frequency which is one-third of the frequency of the clock pulse fed to the clock input terminal thereof. The above-mentioned circuit is arranged such that bits $a_{1,k}$, $b_{1,k}$, $p_{1,k}$ are supplied from the input terminal 23 one after another after being reset so that the output signal at the output terminal is 0, and then operation of formula (2) is executed so that the result of operation is fed to the terminal 14a of the selection signal generating circuit 14 from the output terminal 27, and formulas (3) and (4) are executed after being reset so that results of operation are respectively fed to the terminals 14b and 14c of the selection signal generating circuit 14 from the terminal 27. In the above case, the shift register 7 is not limited to one capable of simultaneously reading out from a plurality of cells, and therefore, other type memories, such as a RAM controlled by a CPU, may be used.

From the foregoing description, it will be understood that a digital signal transmitted without any synchronous word can be synchronized at the receiving end so that original analog information can be accurately restored therefrom. Since, it is possible to detect the boundary between consecutive blocks of the digital signal even if no synchronous signal word has been added to the blocks, the transmission rate can be raised compared to the prior art.

The above-described embodiments are just examples of the present invention, and therefore, it will be apparent for those skilled in the art that many modifications and variations may be made without departing from the spirit of the present invention.

What is claimed is:

1. A method of detecting synchronism of input data blocks constituting a digital signal, where each data block comprises a plurality of data words each having "n" bits, wherein "n" is a positive integer, and a parity word generated in such a manner that each bit in said parity word is given by:

$$p_{m,k} = a_{m,k} \oplus b_{m,k} \oplus \ldots$$

wherein
$a_{m,k}$, $b_{m,k}$ ... are bits in a single row of said plurality of data words;
m is a positive integer and $1 \leq m \leq n$, and
$\oplus$ indicates modulo-two summation;
said "n" bits of each word being transmitted in parallel in such a manner that said digital signal comprises "n" rows, said method comprising the steps of:
(a) storing said digital signal into a memory means in such a manner that said bits $a_{m,k}$, $b_{m,k}$ ... $p_{m,k}$ of each row are stored according to the order of the received words;
(b) reading out from said memory means a plurality of sets forming combinations of consecutive bits, whose number equals the total number of words included in each data block, where the combination of bits in each set is different for each of the plurality of sets of bits;
(c) parity checking simultaneously in connection with said plurality of sets of bits read out from said memory means each time each word is inputted to said memory means;
(d) detecting a state of the absence of parity error to ascertain which set of said bits does not result in parity error; and
(e) deriving a set of bits from said memory means in connection with each row in accordance with the result of the detection of the absence of parity error to output the set of bits as a single row constituting a synchronized data block.

2. A method as claimed in claim 1, wherein the step of parity checking comprises a step of effecting modulo-two summation.

3. A method as claimed in claim 1, wherein the step of deriving the set of bits comprises a step of selecting some bits stored in said memory means in accordance with a signal generated on the basis of the result of parity checking in connection with said plurality of sets of bits.

4. A circuit arrangement for detecting synchronism of input data blocks constituting a digital signal, where each data block comprises a plurality of data words each having "n" bits, wherein "n" is a positive integer, and a parity word generated in such a manner that each bit in said parity word is given by:

$$p_{m,k} = a_{m,k} \oplus b_{m,k} \oplus \ldots$$

wherein
$a_{m,k}$, $b_{m,k}$ ... are bits in a single row of said plurality of data words;
m is a positive integer and $1 \leq m \leq n$, and
$\oplus$ indicates modulo-two summation;
said "n" bits of each word being transmitted in parallel in such a manner that said digital signal comprises "n" rows, said circuit arrangement comprising:
(a) first means for storing said digital signal in such a manner that said bits $a_{m,k}$, $b_{m,k}$ ... $p_{m,k}$ of each row are stored according to the order of the received words;
(b) second means responsive to a plurality of sets forming combinations of consecutive bits read out from said first means, the number of said consecutive bits in each set being equal to the total number of words included in each data block, the combination of bits in each set being different for each of the plurality of bits, said second means being arranged to provide respectively parity checking simultaneously in connection with said plurality of sets of bits read out from said first means each time each word is inputted to said first means;
(c) third means for detecting the absence of parity error to ascertain which set of said bits does not result in parity error; and
(d) fourth means for deriving a set of bits from said first means in connection with each row in accordance with the result of the detection of the absence of parity error to output the set of bits as a single row constituting a synchronized data block.

5. A circuit arrangement as claimed in claim 4, wherein said first means comprises a plurality of shift registers, so that bits of each row are stored in each of said shift register in an order.

6. A circuit arrangement as claimed in claim 4, wherein said second means comprises, for each row, a plurality of parity checkers each responsive to the bits of each set.

7. A circuit arrangement as claimed in claim 4, wherein said second means comprises, for each row, an EX-OR gate responsive to said bits read out from said first means in series, and a D-flip-flop responsive to the output signal from said EX-OR gate, the output signal from said D-flip-flop being fed to an input terminal of said EX-OR gate.

8. A method for synchronizing detection of boundaries between received data blocks each having a plurality of M data words, a block parity word, and free of a synchronizing word, comprising the steps of:
receiving a digital signal representing a plurality of data blocks;
storing the received digital signal in a memory;
selecting different combinations of $M+1$ consecutively received words;
simultaneously performing a parity check on each of the selected combinations each time a word is input to the memory; and
selecting a combination to identify a synchronized received data block when the parity check performed thereon is error-free, thereby defining a boundary between two data blocks transmitted without a synchronizing word therebetween.

9. A method as recited in claim 8 wherein said step of selecting different combinations comprises the step of inputting stored corresponding bits of $2M+1$ consecutively received words to a shift register, and
providing $M+1$ sets of output signals corresponding to each of $M+1$ different sequences of $M+1$ sequential bits in said shift register.

10. A method as recited in claim 9 wherein said step of performing a parity check comprises the step of obtaining for each of said $M+1$ sets a modulo-two sum of said $M+1$ sequential bits.

11. A method as recited in claim 10 wherein said step of selecting a combination as a synchronized received data block comprises the steps of
providing to a switching circuit an output signal representative of a set of signals representing a sequence having a modulo-two sum equal to zero and
controlling the switching circuit to provide as the data block an output of the $M+1$ words including the bits forming the sequence having the modulo-two sum equal to zero.

12. The method as recited in claim 11 wherein the step of inputting stored corresponding bits comprises the further steps of repeatedly shifting the stored bits to said shift register and
for each $M+1$ shifts into said register enabling the switching circuit once to provide an output.

13. The method as recited in claim 11 wherein said step of inputting stored corresponding bits comprises the steps of
inputting a plurality of corresponding sets of corresponding bits to a plurality of shift registers,
said step of obtaining a modulo-two sum comprises the step of obtaining a modulo-two sum for each of said plurality of corresponding sets of corresponding bits,
said step of providing an output signal to a switching circuit comprises the step of obtaining output signals for each of said plurality of sets of corresponding bits, and
providing to said switching circuit an output signal representing a logical combination of said output signals each of which identifies a zero modulo-two sum for a common combination of bits in each of the shift registers thereby identifying the common combination as a data block.

* * * * *